(12) United States Patent
Peters (10) Patent No.: US 10,376,980 B2
(45) Date of Patent: Aug. 13, 2019

(54) ARC WELDING WITH SYNCHRONIZED HIGH FREQUENCY ASSIST ARC INITIATION

(71) Applicant: LINCOLN GLOBAL, INC., City of Industry, CA (US)

(72) Inventor: Steven R. Peters, Huntsburg, OH (US)

(73) Assignee: Lincoln Global, INC., City of Industry, CA (US)

( * ) Notice: Subject to any disclaimer, the term of this patent is extended or adjusted under 35 U.S.C. 154(b) by 1339 days.

(21) Appl. No.: 13/789,788

(22) Filed: Mar. 8, 2013

(65) Prior Publication Data
US 2014/0251968 A1 Sep. 11, 2014

(51) Int. Cl.
*B23K 9/067* (2006.01)
*B23K 9/073* (2006.01)

(52) U.S. Cl.
CPC .......... *B23K 9/0673* (2013.01); *B23K 9/0738* (2013.01)

(58) Field of Classification Search
CPC ...... B23K 9/0673; B23K 9/09; B23K 9/0956; B23K 9/091; B23K 9/1068; B23K 9/1056; B23K 9/1062; B23K 9/1006; B23K 9/0738; B23K 9/1012
USPC .............. 219/130.21, 130.4, 130.51, 130.31, 219/130.33, 130.5, 130.1, 130.32
See application file for complete search history.

(56) References Cited

U.S. PATENT DOCUMENTS

| | | | | | |
|---|---|---|---|---|---|
| 3,328,637 | A * | 6/1967 | Aldenhoff | ............ | B23K 9/0738 219/130.4 |
| 4,038,515 | A * | 7/1977 | Risberg | ................ | B23K 9/1056 219/130.33 |
| 4,119,829 | A * | 10/1978 | Bakardjiev | .......... | B23K 9/0673 219/130.4 |
| 4,876,433 | A * | 10/1989 | Kashima | .............. | B23K 9/1056 219/130.4 |
| 4,897,522 | A * | 1/1990 | Bilczo | .................... | H02M 3/285 219/130.32 |
| 5,338,916 | A * | 8/1994 | Blankenship | .......... | B23K 9/091 219/130.4 |
| 6,472,634 | B1 * | 10/2002 | Houston | .............. | B23K 9/0953 219/130.5 |
| 6,498,321 | B1 * | 12/2002 | Fulmer | ................ | B23K 9/1056 219/130.33 |
| 6,717,107 | B1 * | 4/2004 | Hsu | ...................... | B23K 9/1056 219/130.51 |
| 7,385,159 | B2 * | 6/2008 | Stava | .................... | B23K 9/1043 219/130.4 |

(Continued)

OTHER PUBLICATIONS

International Application No. PCT/IB2014/000285, International Search Report, 4 pages, dated Jan. 14, 2015.

*Primary Examiner* — Tu B Hoang
*Assistant Examiner* — Erin E McGrath (57) ABSTRACT

A method of and system for controlling high frequency arc initiation in a power supply is provided. The power supply includes an output circuit that outputs at least one of a voltage waveform and a current waveform. High frequency, high voltage pulses are induced across a gap between an electrode and a workpiece to create an arc. The method and system further include monitoring at least one of a voltage reading and a current reading across the gap to determine a condition of the arc and controlling the high frequency, high voltage pulses based on the condition of the arc and the type of process, which can be, e.g., SMAW, GTAW, GMAW, FCAW, etc.

11 Claims, 6 Drawing Sheets

(56) References Cited

U.S. PATENT DOCUMENTS

| | | | |
|---|---|---|---|
| 8,269,141 B2* | 9/2012 | Daniel ................. | B23K 9/1006 219/130.1 |
| 2007/0164007 A1 | 7/2007 | Peters et al. | |
| 2007/0170163 A1* | 7/2007 | Narayanan ............. | B23K 9/093 219/130.51 |
| 2008/0264915 A1* | 10/2008 | Manthe ................ | B23K 9/0673 219/130.31 |
| 2010/0176104 A1* | 7/2010 | Peters ................. | B23K 9/0738 219/130.21 |

\* cited by examiner

ARC WELDING WITH SYNCHRONIZED HIGH FREQUENCY ASSIST ARC INITIATION

TECHNICAL FIELD

Certain embodiments relate to arc welding applications. More particularly, certain embodiments relate to controlling high frequency arc initiation in a system and method for any of brazing, cladding, building up, filling, hard-facing overlaying, joining and welding applications.

BACKGROUND

In some arc welding systems, the welding machines require some means of non-contact arc initiation. For example, welding power supplies may include a high frequency ignition circuit or a capacitor discharge circuit to assist in bridging the gap from the electrode to the workpiece. Still other power supplies may be configured to use a "touch start" in which the electrode is initially shorted to the workpiece, but then lifted to initiate an arc after the current from the power supply reaches a preset value, e.g., 20 A. When welding in AC mode, arc stability is an issue because there is a possibility the arc may not re-light each time the waveform goes through zero current when the polarity is switched. The typical arc voltage is usually less than 30 volts OCV. Thus, at reverse polarity, there is only about 50 volts OCV plus any voltage from the output choke to reestablish the arc. This voltage, however, may not always be enough to reestablish the arc, especially in welding power supplies that use SCRs (silicon controlled rectifiers) to control the output welding waveform. This is because SCRs are relatively slow in switching states and the waveform may not go through zero fast enough to maintain the arc. Accordingly, to ensure a stable arc, many welding power supplies also turn on the arc starters each time the polarity is switched.

For example, high frequency ignition circuits can be turned on each time the AC waveform changes polarity. The high frequency ignition circuit induces high voltage, high frequency pulses that generate sparks between the electrode and workpiece to initiate the arc. The high frequency ignition circuit is a reliable method of re-igniting the arc. However, the electrical noise from these high frequency ignition circuits can damage the electronics in modern welding power supplies and other sensitive equipment located in the vicinity or workplace. Accordingly, the industry is making every effort to reduce or eliminate the use of these high frequency ignition circuits. For example, modern welding power supplies (e.g., inverter/chopper based power supplies) typically use a superposition or a center tapped choke to reestablish the arc when the polarity is switched. Because these methods do not use high voltage, high frequency pulses, the sensitive electronics are less susceptible to getting damaged by the electrical noise. However, in extreme conditions, the welding process may still experience a "pop out," i.e., the arc does not re-ignite. Further, once the energy in the choke circuit is released, the process will need to wait until it charges again. Additional information concerning superposition circuits and center-tap choke circuits can be found in U.S. Pat. No. 7,385,159, which is incorporated by reference herein in its entirety as background material.

In addition to the above problems, related art high frequency ignition circuits are not "smart" circuits in that they may operate even when not needed and/or do not communicate with the welding power supply's control system to optimize arc ignition/re-ignition. This is because these circuits are "add on" circuits that are either hard coded or analog, and are not configured to work directly with the welding power supply's control system. The "add on" circuits typically only have a few settings. In one setting, the high frequency ignition circuit is turned on every time the welding waveform changes polarity without regard to whether the arc is on or off. In another setting, the high frequency ignition circuit is used only to initiate the arc but not to reestablish the arc during normal operation. Although some "add on" high frequency ignition circuits have a setting in which they only turn on when there is no arc, the determination of arc/no arc is made by the "add on" circuit without regard to the welding process, i.e., the initiation and/or duration of the high frequency pulses are not controlled by the power supply's control system.

Even in DC welding, such as for example in DC TIG welding, re-ignition of the arc may be required in certain scenarios such as after a short circuit or after the output voltage has been switched off due to a long arc condition. Accordingly, some of the problems with the ignition circuits discussed above with respect to AC welding are also applicable to DC welding.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention comprise controlling high frequency arc initiation in a system and method for any of brazing, cladding, building up, filling, hard-facing overlaying, joining and welding applications. Some exemplary embodiments of the invention include a method for outputting one of a voltage or current waveform. For example, waveforms used in brazing, cladding, building up, filling, hard-facing overlaying, joining and welding applications. The method also includes providing high frequency, high voltage pulses across a gap to initiate an arc. The method further includes monitoring at least one of a voltage reading and a current reading across the gap to determine a condition of the arc and controlling an ignition circuit based on the condition of the arc and the type of process, which can be, e.g., SMAW, GTAW, GMAW, FCAW, etc.

Other exemplary embodiments of the present invention include a power supply for use in a system and method for any of brazing, cladding, building up, filling, hard-facing overlaying, joining and welding applications. The power supply includes an output circuit configured to provide at least one of a voltage waveform and a current waveform. The power also includes an ignition circuit that is configured to provide high frequency, high voltage pulses across a gap. The power supply further includes a control unit operatively connected to the ignition circuit. The control unit is configured to monitor at least one of a voltage reading and a current reading across the gap to determine a condition of an arc. The control unit is also configured to control the ignition circuit based on the condition of the arc and the type of process, which can be, e.g., SMAW, GTAW, GMAW, FCAW, etc. In some exemplary embodiments, the control unit includes a state based programmable controller.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1:
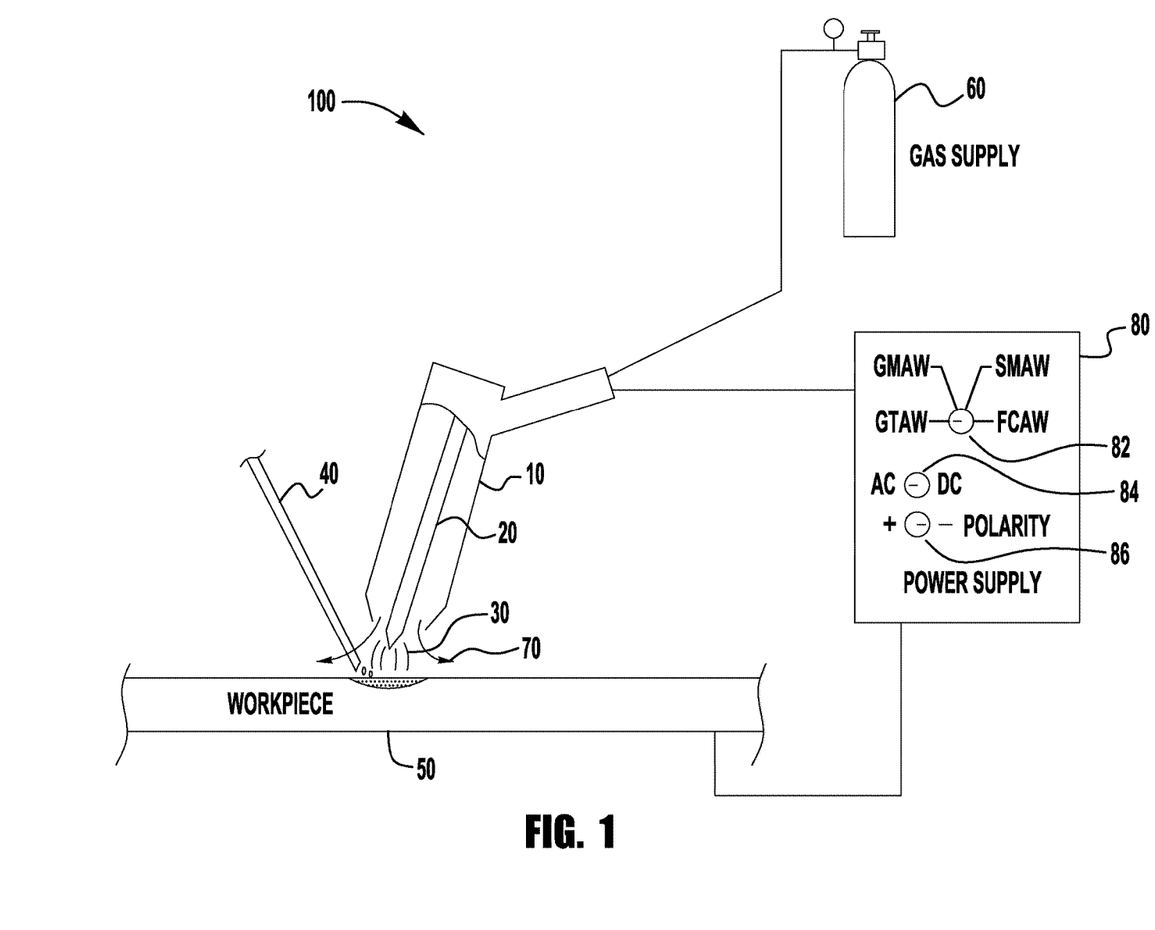
FIG. 1 illustrates a functional schematic block diagram of an exemplary embodiments of a system for any of brazing, cladding, building up, filling, hard-facing overlaying, joining, and welding applications.

FIG. 1 illustrates a system 100 for any of brazing, cladding, building up, filling, hard-facing overlaying, joining, and welding applications. The system 100 includes a welding power supply 80, which can be an inverter-type power supply. The power supply 80 may include a mode or process selector switch 82 that allows the operator to select the type of process (or mode of operation), e.g., GTAW (gas tungsten arc welding) or TIG welding, GMAW (gas metal arc welding), SMAW (shielded metal arc welding), FCAW (flux core arc welding), etc. The power supply 80 also includes a waveform switch 84 that allows the operator to select between an AC welding waveform and a DC welding waveform. For DC welding, the power supply 80 allows the operator to select the welding polarity, i.e., whether electrode 20 is at positive polarity with respect to workpiece 50 or at negative polarity. The power supply 80 can include other controls (not shown) for setting current, voltage, power, wire feed speed, wire size/type, workpiece thickness/type, etc. The general configuration of power supply 80 is known in the art, except for the discussions set forth herein, and for brevity will not be further discussed. An example of such a power supply is the Power Wave® manufactured by The Lincoln Electric Company of Cleveland, Ohio.

Figure 2:
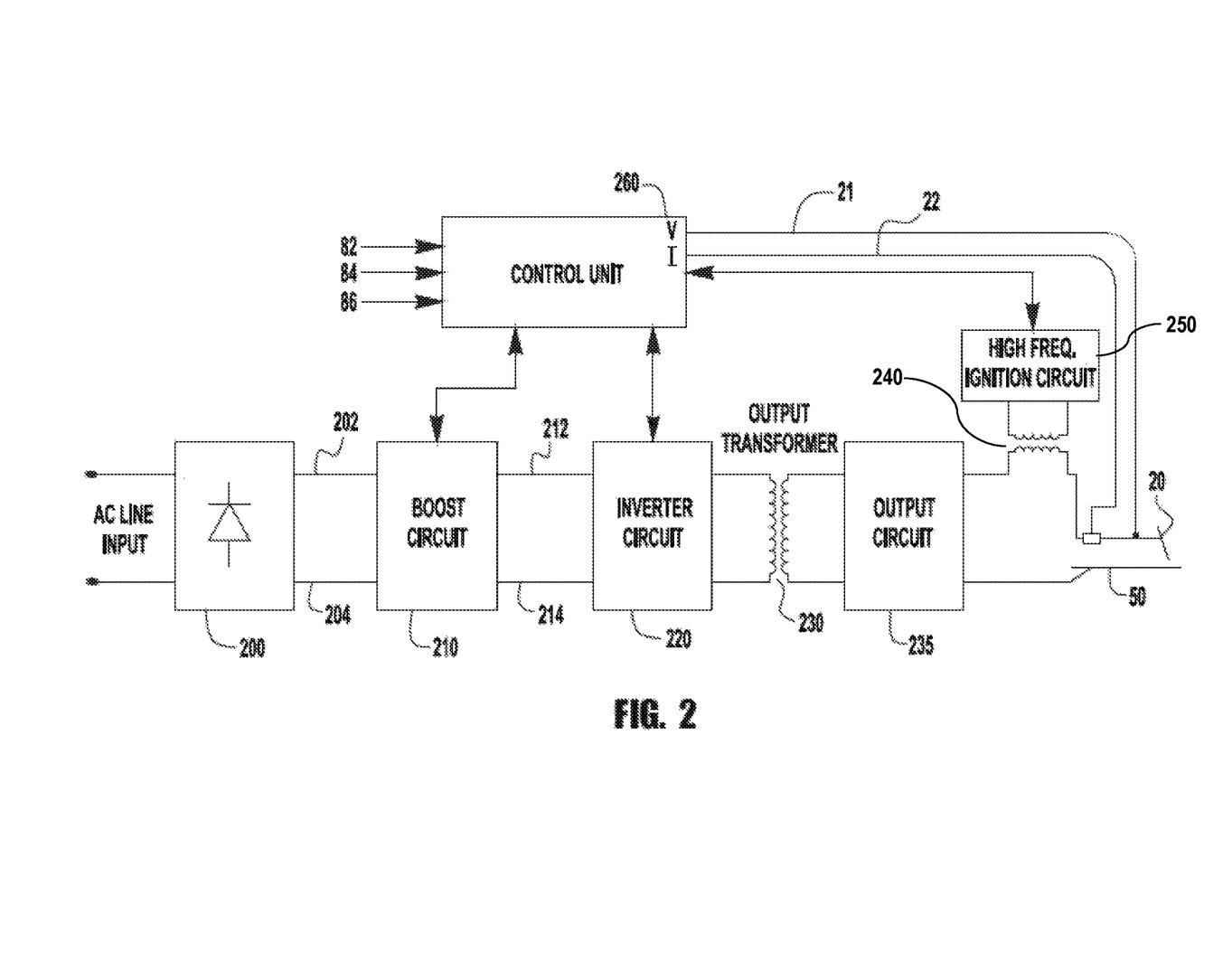
FIG. 2 illustrates an exemplary power supply with a high frequency ignition circuit that can be used in the system of FIG. 1.
Figure 6:
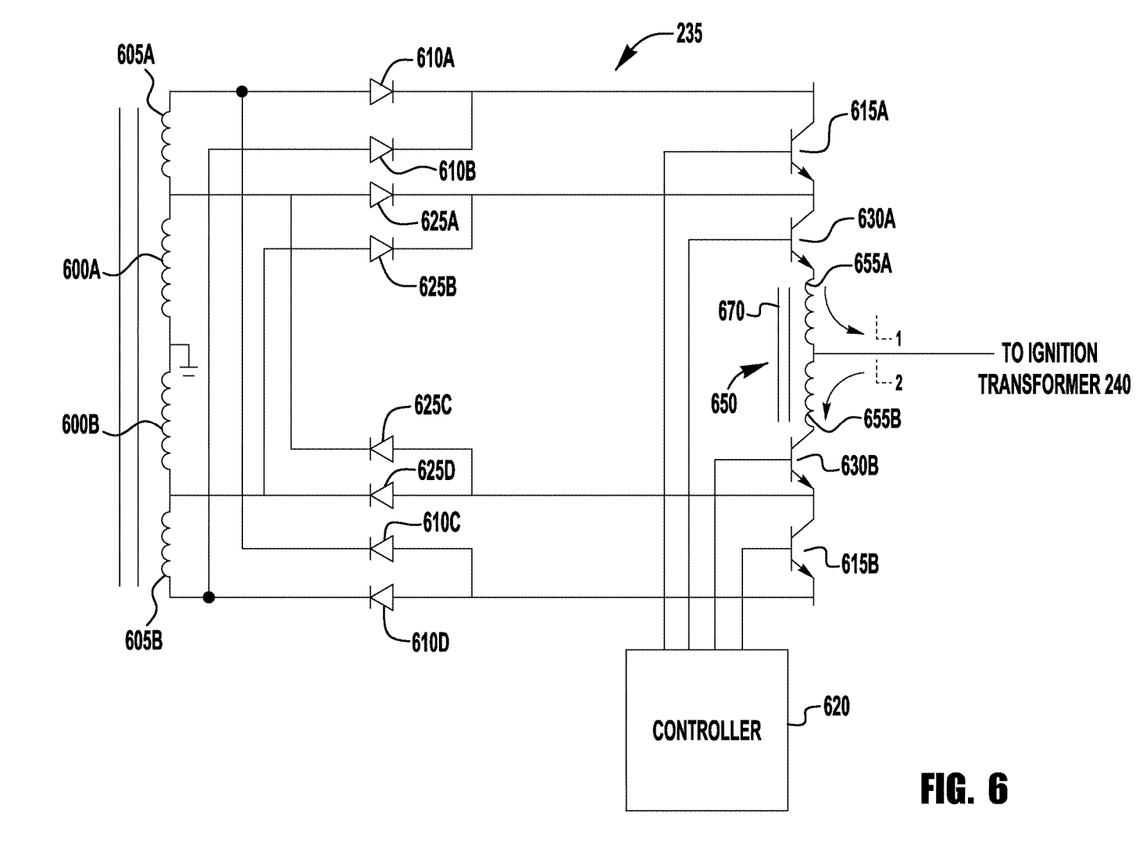
FIG. 6 illustrates a schematic diagram of an exemplary embodiment of an output circuit that can be incorporated into the power supply of FIG. 2.

The power supply 80 is operatively connected to electrode 20, which is housed in torch 10. The power supply 80 and electrode 20 produce arc 30, which heats workpiece 50. An optional wire feed system (not shown) feeds filler wire 40, which provides filler material for joining, welding, brazing, cladding, etc. In some exemplary embodiments, the power supply 80 can be a two-stage power supply as shown in FIG. 2. The illustrated two-stage power supply is well-known in the art and, for brevity, only a high-level overview is given. The rectifier 200 receives single or three phase line AC voltage and rectifies it to a DC voltage, which is output on lines 202 and 204. Typically, the input line AC voltage can range from 100 volts to 575 volts at 50 Hz or 60 Hz depending on the country. Of course, the input AC voltage can be provided by a stand-alone generator rather than from a utility line. After being rectified, the DC voltage on bus 202/204 is received by a boost circuit 210, which boosts the input DC voltage to a desired value, e.g., 400 volts. The boost circuit 210 regulates the voltage on bus 212/214 at the desired value even if there are fluctuations in the input AC voltage. Of course, depending on the input AC line voltage and the desired DC voltage on bus 212/214, circuit 210 can be a buck circuit or a buck/boost circuit rather than just a boost circuit. In addition, the circuit 210 can be configured to provide power factor correction if desired. The regulated DC voltage on bus 212/214 is then converted to high frequency AC by inverter 220. The AC from the inverter 220 is converted to a voltage appropriate for welding by transformer 230 and output circuit 235. The output circuit 235 outputs the appropriate AC or DC welding waveform for the selected welding mode. For example, as illustrated in FIG. 6, the output circuit 235 can include windings 600A and 600B and rectifiers 625A-D. The current flow through these elements is controlled by gates 630A and 630B. The gates 630A and 630B are switched by controller 620 to create the desired welding waveform. In addition, the output circuit 235 can include a superposition circuit that provides an additional "boost" voltage source to increase the OCV of the output circuit 235 during polarity switchover. An exemplary superposition circuit can include additional windings 605A and 605B and rectifiers 610A-D. The current flow through these elements is controlled by controller 620 via gates 615A and 615 B such that the OCV is boosted to at least 100 volts during the polarity switch to sustain the arc. Further, in some embodiments, the output circuit 235 can include a center-tap choke 650 with windings 655A and 655B that utilize stored energy in the core 670 to maintain current flow (i.e., $i_1$ and $i_2$) in the same direction in both sections of the center tapped choke 650 irrespective of the actual voltage polarity. During polarity reversals, the center-tap choke 650 produces a voltage spike to sustain the arc. The configuration of output circuit 235, including features such as superposition circuits and center-tap circuits, is well known in the art and will not be further discussed.

High frequency ignition circuit 250 and its corresponding ignition transformer 240 are operatively connected to the output of output circuit 235 such that the ignition waveform will be superimposed onto the welding waveform from output circuit 235. For example, the secondary of ignition transformer 240 is connected in series between one terminal of output circuit 235 and electrode 20. The ignition circuit 250 is also operatively connected to control unit 260. Control unit 260 operates ignition circuit 250 as needed to initiate and maintain arc 30 as discussed further below. In some embodiments, control unit 260 is operatively connected to the boost circuit 210 and the inverter 220 to control the welding waveform. The above embodiments describe a two-stage power supply. However, the present invention can be readily adapted to other types of power supplies. For example, in some embodiments, the power supply 80 can be a three-stage power supply as described in U.S. patent application Ser. No. 10/889,866, filed on Jul. 13, 2004, and incorporated herein by reference in its entirety.

In exemplary embodiments of the present invention, the process selector switch 82, the waveform selector switch 84 and polarity selector switch 86 are operatively connected to the control unit 260. Based on the welding process and selected waveform, the control unit 260 controls the high frequency ignition circuit 250 as needed to initiate the arc 30 and/or re-ignite it. For example, in exemplary embodiments, if the selected process is SMAW, the control unit 260 can determine that high frequency ignition starter 250 is not required to operate. If the selected process is GTAW, the control unit 260 may determine that ignition starter 250 is needed for only for the AC waveform, only for the DC waveform, or for both AC and DC waveforms. In some exemplary embodiments, the control unit 260 determines whether the ignition circuit 250 is needed only on initial start-up, only for re-ignition purposes, or both. In some exemplary embodiments, the control unit 260 includes a weld table (or look-up table) that has information on which states of operation require the operation of ignition starter 250 for each process and waveform. That is, the weld table can include information on when the arc should be lit and not lit, when high frequency ignition is needed and not needed, etc. for each state of a specific process/waveform that was selected, e.g., GMAW-AC. In some exemplary embodiments, the control unit 260 includes a state based programmable controller. For a state based programmable controller, the selector switch 82 can be programmed to select different synergic programs that are specific to a desired welding operation in addition to (or instead of) the ability to select the modes of operation discussed above (i.e., GTAW, GMAW, SMAW, FCAW, etc.). For example, the specific synergic programs can include programs for specific welding waveform types that can be used with process such as GTAW, GMAW, SMAW, FCAW, etc. (e.g., AC pulse, AC TIG, DC TIG, AC surface tension transfer (STT), etc.), programs for different arc starting methods (e.g., touch start, high frequency starting, etc.), programs for specific consumable diameters (e.g., 0.035, 0.045, etc.), programs for specific weld material types (e.g., steel, aluminum, etc.), and combinations thereof (e.g., "0.045 steel AC pulse," AC TIG with high frequency starting," "0.035 AC STT," etc.). In a programmable state based controller, the weld table can be a state based programmable schedule. The state based programmable schedule can include, for each of the specific synergic programs, specific voltage and/or current levels for the welding waveforms, information on when to fire the high voltage, high frequency ignition circuit, etc. By using a programmable schedule, the high frequency ignition circuit parameters can be changed quickly and easily to meet specific needs without having to modify hard code or analog circuitry. Thus, consistent with the above exemplary embodiments, the control unit 260 can optimize the use of high frequency ignition circuit 250 based on the synergic program, type of operation (GTAW, GMAW, FCAW, etc.) being performed, and/or the polarity (AC/DC).

Figure 3:
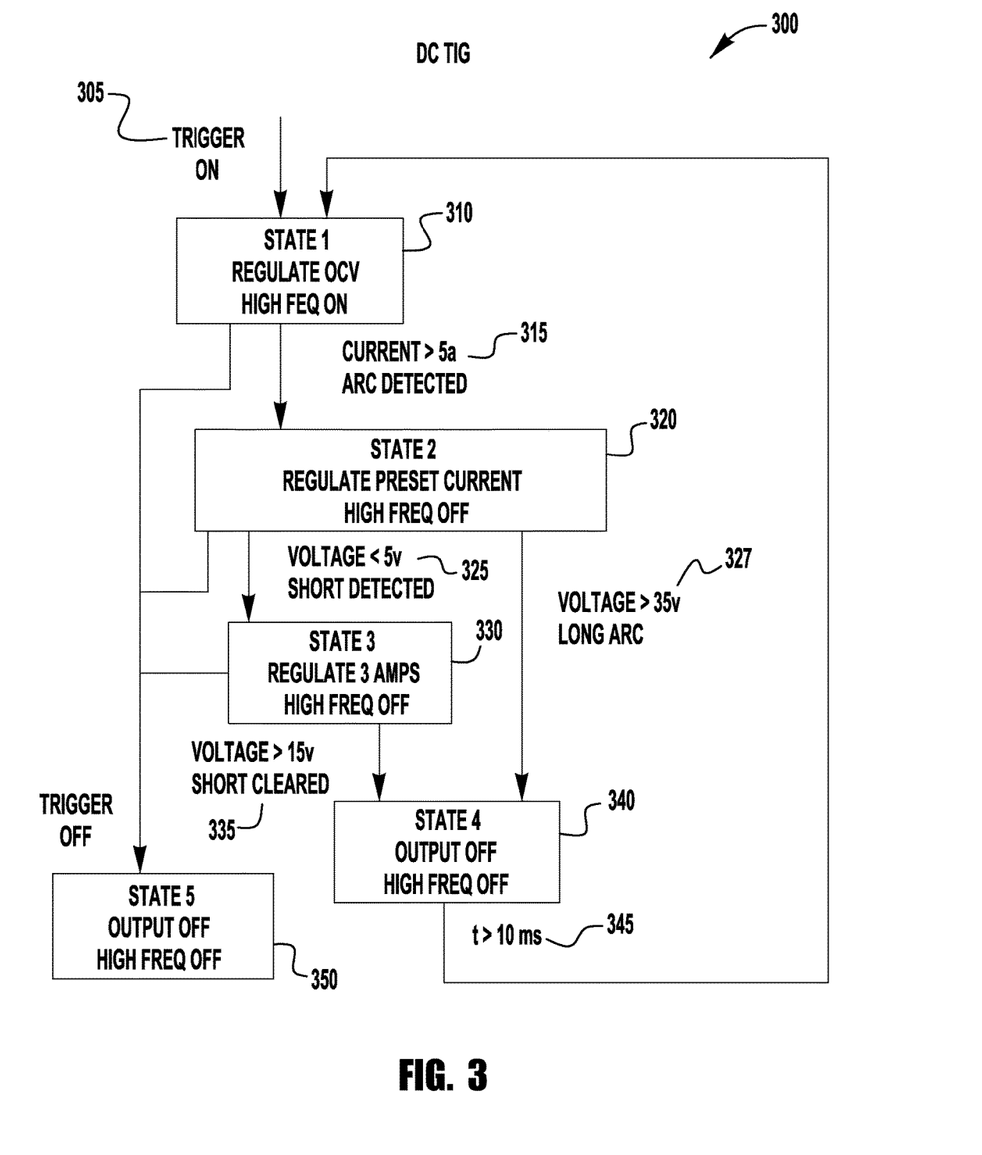
FIG. 3 illustrates an exemplary state diagram for DC TIG operation that can be used in the control unit of FIG. 2.

For example, FIG. 3 illustrates a state diagram 300 for an exemplary synergic program illustrating a GTAW-DC mode of operation for power supply 80 that is consistent with an exemplary embodiment of the present invention. When the trigger for the welding electrode 20 (e.g., an on/off button on torch 10 or a foot pedal (not shown)) is pressed (step 305), the state table of control unit 260 will transition to state 1 and regulate the inverter circuit 220 such that the open circuit voltage (OCV) at the electrode 20 is at a desired setting (step 310). In exemplary embodiments, the OCV can be in the range of 30 volts to 80 volts, with 50 volts being the normal long arc detect point. In addition, to initiate the arc 30, the control unit 260 will turn on the high-frequency ignition circuit 250 (step 310). The high frequency ignition circuit 250/transformer 240 will induce high-voltage, high-frequency pulses that will produce sparks across the gap between electrode 20 and workpiece 50 to create the arc 30.

Once the arc 30 is established, a current will flow between power supply 80 and workpiece 50. The control unit 260 will sense this current I (via sensing line 22) and indicate that an arc has formed when the current reaches a preset limit. The preset limit can be, for example, 5 amps (step 315). Once the control unit 260 determines an arc has formed, the state table of control unit 260 transitions to state 2 and regulates the welding current to a preset value and the high frequency ignition circuit 250 is turned off (step 320). The preset current value is set based on the welding process and can be in the range of 8 amps to 18 amps. The control unit 260 then monitors the voltage V at the electrode 20 (via sensing line 21) and the welding current I through the electrode 20 to workpiece 50. The control unit 260 maintains the preset current value despite minor changes in the electrode voltage.

If the control unit 260 senses that the voltage V at electrode 20 is less than a preset voltage limit, e.g., 5 volts, the control unit 260 determines that the electrode 20 has shorted to the workpiece 50 (step 325) and the state table will transition to state 3, which reduces the amp to a preset value, e.g., 3 amps (step 330). Once the control unit 260 determines that the short has cleared (e.g., electrode voltage is greater than 15 volts—step 335), the state table transitions to state 4 and the output voltage from the power supply 80 is turned off for a preset time period, e.g., 10 ms or more (step 340). The output of the power supply 80 is also turned off if the control unit 260 determines there is a long arc condition by sensing a voltage of, e.g., 35 volts (steps 327 and 340). After the off time period elapses, the state table transitions to state 1, and the control unit 260 once again regulates the OCV to the desired value and turns on the high-frequency ignition circuit 250 (step 310). If the operator releases the trigger at any time during the welding process, the state table transitions to state 5, and the output of power supply 80 and the ignition starter 250 (if on) are turned off (step 350).

Figure 4:
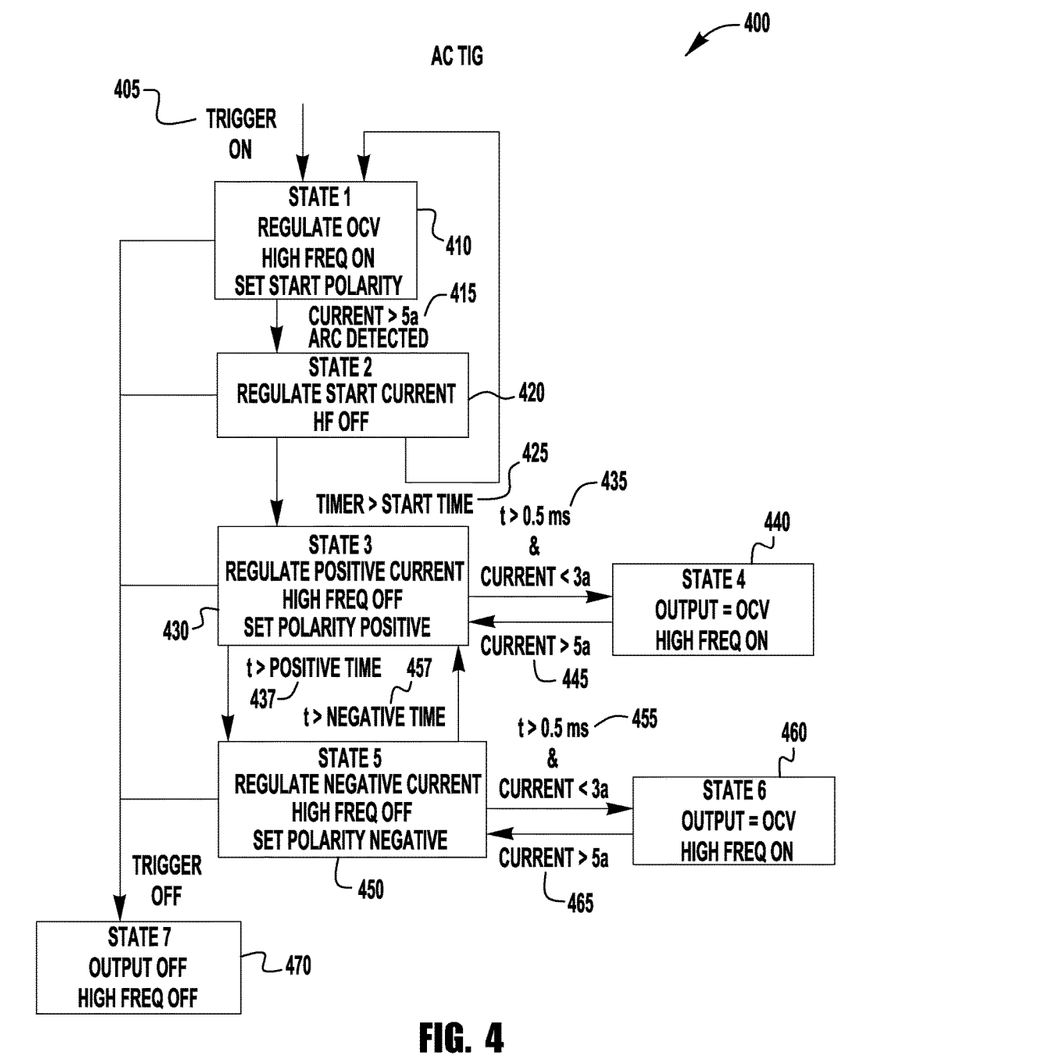
FIG. 4 illustrates an exemplary state diagram for an AC TIG operation that can be used in the control unit of FIG. 2.

FIG. 4 illustrates another exemplary embodiment of the present invention, including an exemplary synergic program for AC-TIG with high frequency starting. FIG. 4 is a state diagram 400 for an AC TIG mode of operation for the power supply 80. When the trigger for the welding electrode 20 is pressed (step 405), the state table of control unit 260 transitions to state 1 and initiates the DC preheating stage by regulating the OCV of the power supply 80 to a preset value (step 410). The preset value may be between 60 volts and 80 volts. Of course, depending on the type of welding machine and welding process, other OCV values can be used. The control unit 260 will also set the start polarity to either positive or negative either manually based on operator input or automatically based on, e.g., a look-up table. To initiate the arc 30, the control unit 260 will turn on the high-frequency ignition circuit 250 as discussed above.

When the arc 30 is initiated, the control unit 260 will sense a current between the electrode 20 and the workpiece 50. Once the current reaches a preset limit, e.g., 5 amps, the control unit 260 determines an arc has formed and the state table will transition to state 2, where the high frequency ignition circuit 250 is turned off (steps 415 and 420). While in state 2, the control unit 260 will regulate the preheating current to a preset value, e.g. between 50 to 150% of the preset welding current. The preheating current is maintained for a predetermined time period, e.g., 0.1 to 0.5 seconds.

Figure 5A:
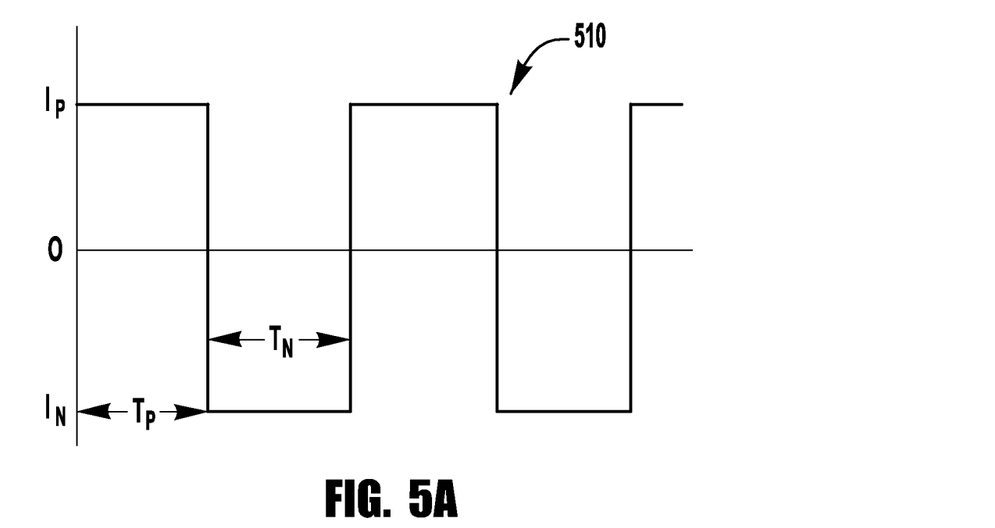
FIGS. 5A and 5B are exemplary AC waveforms that can be used in the system of FIG. 1.
Figure 5B:
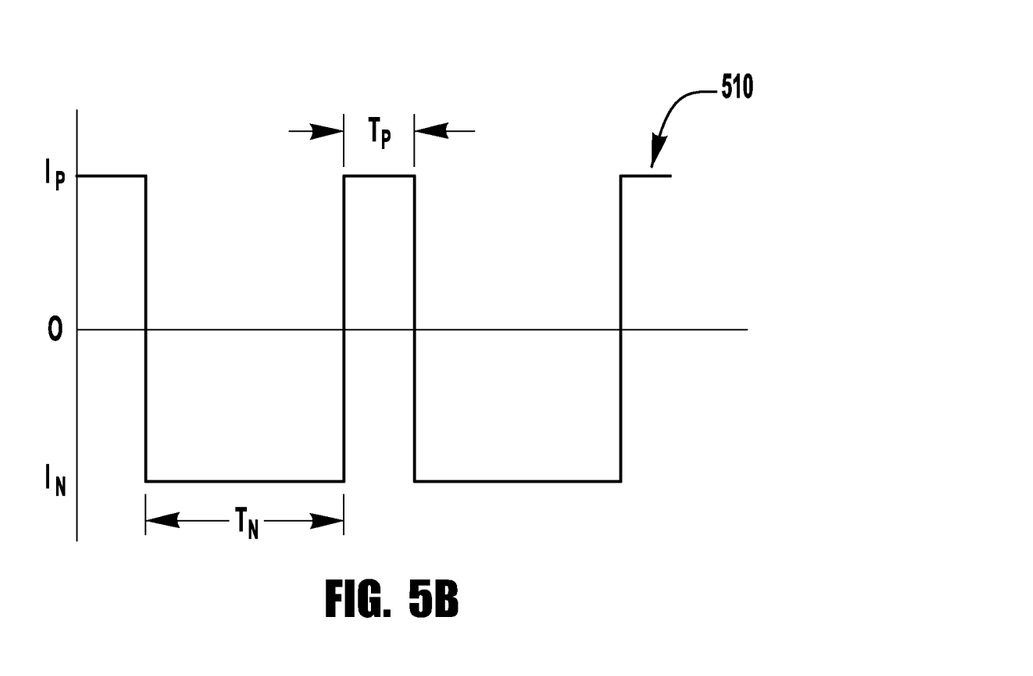

Once the preheating current has been maintained for its predetermined time period (step 425), the state table of control unit 260 transitions to state 3 and a desired AC welding waveform is initiated, e.g., a waveform such as that shown in FIG. 5A. FIG. 5A illustrates the current waveform and the polarity as seen by electrode 20. In state 3 (step 430), the control unit 260 regulates the positive portion of the AC waveform 510 by setting the value for the positive polarity ($I_P$), which can range from 50 amps to 500 amps. After the waveform is at the positive polarity $I_P$ for a predetermined time period ($T_P$) (step 437), the state table of control unit 260 will transition to state 5 and regulate the negative portion of the waveform 510 at the negative polarity ($I_N$), which can range from 50 amps to 500 amps (step 450). After regulating the negative portion of waveform 510 for a predetermined time period ($T_N$) (step 457), the state table will transition back to state 3. Based on the type of welding to be performed, the state table of control unit 260 can control the amount of time the welding waveform 510 is in each portion of the AC cycle. For example, if the workpiece 50 is only lightly oxidized, the waveform 510 may be mostly negative polarity as shown in FIG. 5B, e.g., the time period $T_N$ can be 75% to 95% of the waveform cycle. If the workpiece 50 is heavily oxidized, the waveform may be split more evenly between positive and negative as shown in FIG. 5A. Accordingly, the state table of control unit 260 can be configured to optimize the waveform 510 to the welding conditions. Of course, the choice of which portion of the waveform 510 is initially regulated is not limiting and the negative portion of the waveform 510 can be regulated first. In addition, in the above exemplary embodiment, the waveform 510 is illustrated as a square wave, but the waveform 510 is not limited to just a square wave can be any type of AC waveform suitable for welding such, for example, a modified "soft" square wave, a sine wave, and a triangular wave—to name just a few. U.S. patent application Ser. No. 11/331,869, which is incorporated by reference herein in its entirety, discloses exemplary embodiments of synergic operation of a welding state table in an AC TIG process. Accordingly, regulation of the welding waveform will not be further discussed.

During welding operations, the control unit 260 monitors the voltage V at the electrode 20 and the current I to workpiece 50 in order to maintain the preset current value. This preset value is maintained despite minor changes in the electrode voltage, due to, for example, changes in the arc length. However, unlike the DC TIG, the welding waveform in AC TIG must go through zero volts, i.e., when the waveform 510 changes polarity from $I_N$ to $I_P$. When the waveform 510 goes to zero volts, the arc 30 could extinguish. Accordingly, the control unit 260 monitors for a "pop out" condition, i.e., loss of the arc 30. For example, a "pop out" condition may exist if the welding current is less than a predetermined value for a predetermined time period and/or if the voltage at electrode 20 is higher than a predetermined value for a predetermined time period. The predetermined time period can be in the range of 0.1 ms to 0.5 ms. The predetermined current value may be a current that is less than 3 amps. The predetermined voltage value is a percentage of the OCV and can be in the range of 40% to 100% of the welding machine's OCV, which can be different from the regulated OCV.

Once the control unit 260 determines there is a "pop out" condition (step 435 or step 455), the state table of control unit 260 transitions to state 4 (step 440) or state 6 (step 460) depending on whether the waveform 510 was transitioning from negative to positive polarity or positive to negative polarity, respectively. At either state 4 or state 6, the control unit 260 will set the output of power supply 80 to the OCV and turn on the high-frequency ignition circuit 250 (step 440 or step 460). As discussed above, the high frequency ignition circuit 250 with ignition transformer 240 will initiate the arc 30 by inducing sparks in the gap between the electrode 20 and the workpiece 50. When the welding current reaches a predetermined value, e.g., 5 amps (step 445 or step 465), the state table will transition from state 4 to state 3 or state 6 to state 5, depending on the direction of the polarity change of waveform 510. In state 3 or state 5, the control unit 260 will determine that the arc 30 has been initiated and will turn off the high-frequency ignition circuit 250 (step 430 or step 450). As before, if the operator releases the trigger at any time during the welding process, the state table transitions to state 7 and the output of power supply 80 and the high frequency ignition circuit 250 (if on) are turned off (step 470).

In addition, similar to the DC mode of operation, if the control unit 260 senses that the voltage at electrode 20 is less than a preset limit, e.g., 5 volts rms, the control unit 260 determines that the electrode 20 has shorted to the workpiece 50 and the state table will transition to a state (not shown) in which the control unit 260 will reduce the output current to a preset value, e.g., 3 amps, until the short has cleared. Once the control unit 260 determines that the short has cleared (e.g., electrode voltage is greater than 15 volts rms), the output voltage from the power supply 80 is turned off for a preset time period, e.g., 10 ms or more. After the power supply 80 has been off for the preset time period, the state table of control unit 260 will transition to state 1 (step 410) during which the control unit 260 regulates the OCV and starts the high-frequency ignition circuit 250 as discussed above. Also as in the DC mode of operation, the output of the power supply 80 is turned off if the control unit 260 determines there is a long arc condition by sensing a long arc voltage of, e.g., 23 to 50 volts rms, at the electrode 20. After a predetermined time period of, e.g., 1 to 500 ms, the control unit 260 once again regulates the OCV to the desired value and turns on the high-frequency ignition circuit 250. The predetermined time period can be longer or shorter based on the time to extinguish the arc and for the current to go to zero, which is dependent on the inductance of the system.

In the above exemplary embodiments, the control unit 260 monitors the welding process and has information to determine what should be happening in each state. Accordingly, the state table can be configured such that the control unit 260 can control high frequency ignition circuit 250 to optimize the process and limit the high frequency electrical noise. For example, when a "pop out," condition is detected, the control unit 260 can turn on ignition circuit 250 to ignite the arc and turn it back off in less than 50 microseconds to 10 milliseconds.

In exemplary embodiments of the system, the high-frequency ignition circuit 250 is a secondary or back-up system for re-igniting the arc. That is, the control unit 260 turns on ignition circuit 250 only after a primary re-ignition circuit or circuits have failed to operate. The primary re-ignition circuit(s) can be, e.g., a superposition circuit and/or a center-tap circuit discussed above. In such embodiments, the "pop out" condition timers in steps 435 and 455 can take into account the time required to determine whether the primary re-ignition circuit or circuits have worked. In this way, the disruptions caused by the high-frequency electrical noise from the ignition circuit 250 will be further minimized while still maintaining the stability of the arc.

The above exemplary embodiments are generally described with respect to welding applications and, more specifically, to TIG welding applications. However, the present invention is not limited to TIG welding applications and can include other welding, cladding, brazing technologies as long as there is an arc.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

I claim:

1. A power supply with synchronized high frequency arc assist, said power supply comprising:
   an output circuit that is configured to output at least one of a voltage waveform and a current waveform to a torch;
   an ignition circuit that is connected to the torch between the output circuit and the torch and that is configured to initiate high frequency, high voltage pulses across a gap, wherein said high frequency, high voltage pulses are superimposed on said at least one of a voltage waveform and a current waveform;
   a monitoring circuit that is configured to monitor at least one of a voltage across said gap and a current passing through said gap; and
   a controller operatively connected to said output circuit to regulate said at least one of a voltage waveform and a current waveform based on a desired process,
   wherein said controller is configured to select an ignition operation for said high frequency, high voltage pulses based on said desired process,
   wherein said controller is operatively connected to said monitoring circuit and is configured to determine a condition of an arc across said gap based on said at least one of said voltage across said gap and said current passing through said gap,
   wherein said controller is configured to control said ignition circuit based on said selected ignition operation and said arc condition,
   wherein the output circuit includes both a center-tapped output choke and a superposition circuit for re-igniting the arc, and the ignition circuit is connected between a center tap of the output choke and the torch,
   wherein said controller is configured to activate said high frequency, high voltage pulses after determining that said condition of said arc is off based on said at least one of said voltage across said gap and said current passing through said gap being at a respective predetermined value for a predetermined period of time, and
   wherein said predetermined period of time is in a range of 0.1 ms to 0.5 ms.

2. The power supply of claim 1, wherein said ignition operation is selected from igniter modes of operation for said high frequency, high voltage pulses which comprise:
   said pulses are not needed,
   said pulses are needed only for an initial ignition of said arc,
   said pulses are needed only for a re-ignition of said arc, and
   said pulses are needed for both said initial ignition and said re-ignition of said arc,
   wherein said controller is configured to select any of said igniter modes of operation.

3. The power supply of claim 1, wherein said controller is configured to determine that said condition of said arc is off based on said current passing through said gap, and
   wherein said predetermined value is less than 3 amps.

4. The power supply of claim 1, wherein said controller is configured to determine that said condition of said arc is off based on said voltage across said gap, and
   wherein said predetermined value is in a range of 40% to 100% of an open circuit voltage of said power supply.

5. A power supply with synchronized high frequency arc assist, said power supply comprising:
   an output circuit that is configured to output at least one of a voltage waveform and a current waveform to a torch;
   an ignition circuit that is connected to the torch between the output circuit and the torch and that is configured to initiate high frequency, high voltage pulses across a gap, wherein said high frequency, high voltage pulses are superimposed on said at least one of a voltage waveform and a current waveform;
   a monitoring circuit that is configured to monitor at least one of a voltage across said gap and a current passing through said gap;
   a control unit comprising a state based programmable controller, said state based controller comprising at least one state based program defining a welding operation based on at least one of a welding waveform type, an arc starting method, a diameter of a consumable, and weld material type;
   wherein a desired program is selected from said at least one state based program and said control unit is operatively connected to said output circuit to regulate said at least one of a voltage waveform and a current waveform based on said desired program,
   wherein said control unit is configured to select an ignition operation for said high frequency, high voltage pulses based on said desired program,
   wherein said control unit is operatively connected to said monitoring circuit and is configured to determine a condition of an arc across said gap based on said at least one of said voltage across said gap and said current passing through said gap,
   wherein said control unit is configured to control said ignition circuit based on said selected ignition operation and said arc condition,
   wherein the output circuit includes both a center-tapped output choke and a superposition circuit for re-igniting the arc, and the ignition circuit is connected between a center tap of the output choke and the torch,
   wherein said control unit is configured to activate said high frequency, high voltage pulses after determining that said condition of said arc is off based on said at least one of said voltage across said gap and said current passing through said gap being at a respective predetermined value for a predetermined period of time, and
   wherein said predetermined period of time is in a range of 0.1 ms to 0.5 ms.

6. The power supply of claim 5, wherein said control unit further comprises a programmable state based schedule for each of at least one state based program, each said programmable state based schedule comprising information on when said arc should be on and when said arc should be off, and information on when said high frequency, high voltage pulses are needed.

7. The power supply of claim 5, wherein said ignition operation is selected from igniter modes of operation for said high frequency, high voltage pulses which comprise,
said pulses are not needed,
said pulses are needed only for an initial ignition of said arc,
said pulses are needed only for a re-ignition of said arc, and
said pulses are needed for both said initial ignition and said re-ignition of said arc,
wherein said control unit is configured to select any of said igniter modes of operation.

8. The power supply of claim 5, wherein said control unit is configured to determine that said condition of said arc is off based on said current passing through said gap, and
wherein said predetermined value is less than 3 amps.

9. The power supply of claim 5, wherein said control unit is configured to determine that said condition of said arc is off based on said voltage across said gap, and
wherein said predetermined value is in a range of 40% to 100% of an open circuit voltage of said power supply.

10. A system for providing high frequency arc assist, said system comprising:
an electrode;
a workpiece; and
a power supply, said power supply comprising,
an output circuit that is configured to output at least one of a voltage waveform and a current waveform to at least one of said electrode and said workpiece;
an ignition circuit that is connected to the electrode through an ignition transformer between the output circuit and the electrode, and that is configured to initiate high frequency, high voltage pulses across a gap between said electrode and said workpiece to create an arc, wherein said high frequency, high voltage pulses are superimposed on said at least one of a voltage waveform and a current waveform;
a monitoring circuit that is configured to monitor at least one of a voltage reading and a current reading across said gap; and
a controller operatively connected to said output circuit to regulate said at least one of said voltage waveform and said current waveform based on a desired process,
wherein said controller is configured to select an ignition operation for said high frequency, high voltage pulses based on said desired process,
wherein said controller is operatively connected to said monitoring circuit and is configured to determine a condition of said arc across said gap based on said at least one of a voltage reading and a current reading across said gap,
wherein said controller is configured to control said ignition circuit based on said selected ignition operation and said arc condition,
wherein the output circuit includes both a center-tapped output choke and a superposition circuit for re-igniting the arc, and the ignition circuit is connected through the ignition transformer between a center tap of the output choke and the torch,
wherein said controller is configured to activate said high frequency, high voltage pulses after determining that said condition of said arc is off based on said at least one of said voltage across said gap and said current passing through said gap being at a respective predetermined value for a predetermined period of time, and
wherein said predetermined period of time is in a range of 0.1 ms to 0.5 ms.

11. The system of claim 10, wherein said ignition operation is selected from igniter modes of operation for said high frequency, high voltage pulses which comprise,
said pulses are not needed,
said pulses are needed only for initial ignition of said arc,
said pulses are needed only for a re-ignition of said arc, and
said pulses are needed for both said initial ignition and said re-ignition of said arc,
wherein said controller is configured to select any of said igniter modes of operation.

* * * * *